United States Patent
Zhang

(10) Patent No.: US 11,815,604 B2
(45) Date of Patent: Nov. 14, 2023

(54) PASSIVE NANO-ANTENNA ARRAY RECEIVER AND THREE-DIMENSIONAL IMAGING SYSTEM

(71) Applicant: SHENZHEN LITRA TECHNOLOGY CO., LTD, Shenzhen (CN)

(72) Inventor: Zhongxiang Zhang, Shenzhen (CN)

(73) Assignee: SHENZHEN LITRA TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/959,403

(22) PCT Filed: May 27, 2020

(86) PCT No.: PCT/CN2020/092576
§ 371 (c)(1),
(2) Date: Jun. 30, 2020

(87) PCT Pub. No.: WO2021/237506
PCT Pub. Date: Dec. 2, 2021

(65) Prior Publication Data
US 2023/0137561 A1    May 4, 2023

(51) Int. Cl.
*G01S 17/89*    (2020.01)
*G01S 7/481*    (2006.01)

(52) U.S. Cl.
CPC .............. *G01S 17/89* (2013.01); *G01S 7/481* (2013.01)

(58) Field of Classification Search
CPC ........ G01S 17/89; G01S 7/481; G01S 7/4816; G01S 7/4817
(Continued)

(56) References Cited

U.S. PATENT DOCUMENTS 5,024,529 A    6/1991    Svetkoff et al.
6,177,909 B1   1/2001    Reid et al.
(Continued)

FOREIGN PATENT DOCUMENTS

CN    101663575 A    3/2010
CN    107329132 A    11/2017
(Continued)

OTHER PUBLICATIONS

"A 3-D Sparse FIR Frustum Filter for Enhancing Broadband Plane Waves" Wijesekara, Ravi T.; Mar. 31, 2019.
(Continued)

*Primary Examiner* — Juan A Torres
(74) *Attorney, Agent, or Firm* — CANTOR COLBURN LLP

(57) ABSTRACT

The present application discloses a passive nano-antenna array receiver and a three-dimensional imaging system. The passive nano-antenna array receiver includes a receiving lens, a passive nano-antenna array at a receiving end, a focusing lens assembly, and an optical receiver; the receiving lens is configured to receive incident light and focus the incident light to the passive nano-antenna array at the receiving end; the passive nano-antenna array at the receiving end is configured to deflect an angle of a light beam output by the receiving lens, so that an optical axis of the outgoing light is perpendicular to the passive nano-antenna array at the receiving end; the focusing lens assembly is configured to focus the outgoing light output by the passive nano-antenna array at the receiving end to the optical receiver; the optical receiver is configured to convert a received optical signal into an electrical signal.

16 Claims, 4 Drawing Sheets

(58) Field of Classification Search
USPC .......................................................... 382/103
See application file for complete search history.

(56) References Cited

U.S. PATENT DOCUMENTS

| | | | | |
|---|---|---|---|---|
| 6,341,136 | B1* | 1/2002 | Hiiro | H01S 5/4025 |
| | | | | 372/100 |
| 8,233,049 | B2 | 7/2012 | Kasai et al. | |
| 9,476,981 | B2* | 10/2016 | Yaacobi | G01S 17/931 |
| 10,048,117 | B2* | 8/2018 | Iemura | G01J 1/0214 |
| 11,454,772 | B2* | 9/2022 | Yu | H04J 14/04 |
| 11,567,390 | B1* | 1/2023 | Uthoff | G01J 1/44 |
| 11,573,298 | B2 | 2/2023 | Zhang et al. | |
| 11,573,324 | B2* | 2/2023 | Koduri | H01L 31/107 |
| 2004/0213587 | A1* | 10/2004 | Conchas | H04B 10/1123 |
| | | | | 398/212 |
| 2005/0285541 | A1* | 12/2005 | LeChevalier | H01J 3/36 |
| | | | | 315/169.3 |
| 2007/0122155 | A1* | 5/2007 | Hillis | H01Q 3/2676 |
| | | | | 398/115 |
| 2007/0132631 | A1 | 6/2007 | Henson et al. | |
| 2016/0036529 | A1 | 2/2016 | Griffith et al. | |
| 2016/0139266 | A1* | 5/2016 | Montoya | G01S 17/42 |
| | | | | 356/5.01 |
| 2018/0113201 | A1* | 4/2018 | Toko | G01S 17/06 |
| 2018/0267140 | A1 | 9/2018 | Corcos et al. | |
| 2021/0215800 | A1 | 7/2021 | Zhang et al. | |

FOREIGN PATENT DOCUMENTS

| | | |
|---|---|---|
| CN | 207440292 U | 6/2018 |
| CN | 109471195 A | 3/2019 |
| CN | 110579775 A | 12/2019 |
| CN | 110780283 A | 2/2020 |
| CN | 111190164 A | 5/2020 |
| KR | 20200029925 A | 3/2010 |
| WO | 9612322 A2 | 4/1996 |

OTHER PUBLICATIONS

First Office Action dated Mar. 1, 2023; Chinese Application No. 202010461270.8; 8 pages (non-English).
Search Report dated Mar. 3, 2021 for Application No. PCT/CN2020/092576.

* cited by examiner (a)

(b)

PASSIVE NANO-ANTENNA ARRAY RECEIVER AND THREE-DIMENSIONAL IMAGING SYSTEM

CROSS REFERENCE TO RELATED APPLICATIONS

This application is a National Stage of PCT Application No. PCT/CN2020/092576 filed on May 27, 2020, the content of which is incorporated herein by reference thereto.

TECHNICAL FIELD

The present application relates to the field of three-dimensional imaging technologies, and in particular to a passive nano-antenna array receiver and a three-dimensional imaging system.

BACKGROUND

The statements here only provide background information related to the present application and do not necessarily constitute prior art. Currently, the three-dimensional imaging has a wide range of applications in fields such as automobiles, industrial automation, virtual reality and so on. The current three-dimensional imaging systems are divided into a scan-based three-dimensional imaging system and a three-dimensional imaging system based on planar array reception. The scan-based three-dimensional imaging is implemented through single-point distance measurement by a laser beam or an LED beam with a small divergence angle, and then scanning by making the beam at different positions of space, so as to form a three-dimensional image via combination. The imaging based on planar array reception generally uses flood illumination, and some designs of which use a scan-based emitting end, and a receiving end with a planar array reception chip (also called focal plane array).

However, in the existing scanning systems, the system needs to maintain at a relatively long measurement distance, and it must be ensured that the receiving end is provided with a relatively large receiving aperture and scan synchronously with the emitting end, and these requirements for a scanning method are too strict. Moreover, the planar array reception chip is used as the receiving end, although it can achieve wide-angle reception and ensure signal-to-noise ratio, the period for designing and developing the planar array reception chip is very long, and the planar array reception chip has a defect of low resolution due to limitations of the pixel size and the complexity of the signal processing circuit. The technical contents of scan-based transmission and planar array reception have been constantly balanced and combined regarding the three-dimensional imaging systems, however, at present, there is no technical means that can be applied to various different three-dimensional imaging application scenarios.

SUMMARY

Technical Problem

One of purposes of embodiments of the present application is to provide a passive nano-antenna array receiver and a three-dimensional imaging system, which provide a technical means enable to be flexibly applied to various different three-dimensional imaging application scenarios.

Technical Solutions

In order to solve the above technical problem, technical solutions adopted by embodiments of the present application are as follows.

A first aspect provides a passive nano-antenna array receiver, which includes a receiving lens, a passive nano-antenna array at a receiving end, a focusing lens assembly, and an optical receiver;

the receiving lens is configured to receive incident light and focus the incident light to the passive nano-antenna array at the receiving end;

the passive nano-antenna array is configured to deflect an angle of a light beam output by the receiving lens, and transmit outgoing light generated after the angle deflection to the focusing lens assembly, wherein an optical axis of the outgoing light is perpendicular to the passive nano-antenna array;

the focusing lens assembly is configured to focus the outgoing light output by the passive nano-antenna array to the optical receiver;

the optical receiver is configured to convert a received optical signal into an electrical signal.

In an embodiment, the passive nano-antenna array at the receiving end includes a plurality of sub-antenna arrays, and deflection directions of the plurality of sub-antenna arrays are different from each other.

In an embodiment, the sub-antenna array includes a plurality of nano-antenna elements arranged in sequence, and the plurality of nano-antenna elements have a phase distribution with gradual gradients to achieve deflection control of a light beam.

In an embodiment, a material of the nano-antenna element is at least one of a metal material, a semiconductor material and a media material.

In an embodiment, a shape of the nano-antenna element is at least one of a cylinder, a square, a cross, a circular hole, a square hole, a cross hole, a V-shape, an annular linear shape, and a curved shape.

In an embodiment, a relationship between the deflection angle of the sub-antenna array and the nano-antenna element is:

$$\theta = \arctan(D/f);$$

where $\theta$ is the deflection angle, $D$ is a distance between the sub-antenna array and the optical axis of the outgoing light, and $f$ is a focal length of the receiving lens.

A second aspect provides a three-dimensional imaging system, which includes:

a laser emitter unit, configured to emit a laser signal, wherein the laser signal is reflected by a target object to generate a laser reflection signal;

the passive nano-antenna array receiver of any one of claims 1-7, configured to receive the laser reflection signal and convert the laser reflection signal into a corresponding electrical signal;

a signal processing unit, configured to receive the electrical signal and generate target distance information based on the electrical signal;

a central controller, configured to transmit a scanning signal to the laser emitter unit to control an emission angle of the laser signal, and configured to generate three-dimensional coordinates of the target object according to the scanning signal and the target distance information.

In an embodiment, the laser emitter unit includes:

a laser drive unit, configured to generate a laser drive signal;

a laser device, connected to the laser drive unit and configured to generate the laser signal according to the laser drive signal;

an emitting collimation lens, configured to collimate the laser signal;

a beam scanner of the emitting end, connected to the central controller and configured to receive the scanning signal and adjust the emission angle of the laser signal according to the scanning signal.

In an embodiment, the beam scanner of the emitting end is any one of a mechanical scanner, a MEMS scanning mirror, a solid-state scanner with an optical phase array, and a spatial light modulator.

Beneficial Effects

The beneficial effects of the passive nano-antenna array receiver provided by the embodiments of the present application lie in that: the passive nano-antenna array receiver in the embodiments of the present application adopts a passive nano-antenna array design at the receiving end, the processing technology of which is simple and no power-on control is required, therefore not only the power consumption of the three-dimensional imaging system can be reduced, but also the system manufacturing cost can be reduced.

The beneficial effects of the three-dimensional imaging system provided by the embodiments of the present application lie in that:

1) Compared with a three-dimensional imaging system using a planar array reception chip, the passive nano-antenna array receiver in the embodiments of the present application uses a single-point or multi-point optical receiver, which not only greatly reduces the manufacturing cost of the three-dimensional imaging system, but also improves the flexibility of signal processing and signal-to-noise ratio;

2) compared to a three-dimensional imaging system that synchronously scans in transmitting and receiving, the passive nano-antenna array receiver in the embodiments of the present application can realize solid-state signal reception with a large aperture;

3) the structure of the three-dimensional imaging system in the embodiments of the present application can output more point clouds without being limited to the scale of the planar array, thereby improving the spatial resolution.

DESCRIPTION OF THE DRAWINGS

In order to more clearly illustrate the technical solutions in the embodiments of the present application, the following will briefly introduce the drawings needed to be used in the description for the embodiments or exemplary technologies. Obviously, the drawings in the following description are only some embodiments of the present application, and other drawings may be obtained for those of ordinary skill in the art based on these drawings without creative efforts.

EMBODIMENTS OF THE APPLICATION

Figure 1:
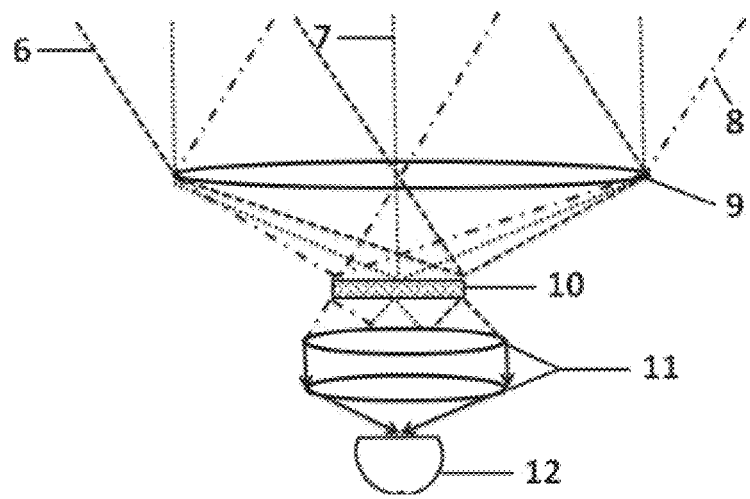
FIG. 1 is a schematic structural diagram of a passive nano-antenna array receiver provided by an embodiment of the present application.

In order to make the purposes, technical solutions and advantages of the present application more clear, the present application will be described in further detail in conjunction with the accompanying drawings and embodiments. It should be understood that the specific embodiments described herein are only used to explain the present application and are not intended to limit the present application.

It should be noted that, when a component is referred to as being "fixed" or "arranged" on another component, the component may be on said another component directly or indirectly. When a component is referred to as being "connected to" another component, the component may be connected to said another component directly or indirectly. The orientation or positional relationship indicated by a term such as "upper", "lower", "left", "right", etc. is based on the orientation or positional relationship as shown in the drawings, which is only for the convenience of description, but not to indicate or imply that the indicated device or element must have a specific orientation, or be constructed and operated in a specific orientation. Therefore, it cannot be understood as a limitation of the present application. For those of ordinary skill in the art, the specific meaning of the above terms can be understood according to specific conditions. The terms "first" and "second" are used for a descriptive purpose only, and cannot be understood as indicating or implying relative importance or implicitly indicating the number of technical features. The meaning of "plurality" means two or more, unless specifically defined otherwise.

In the scan-based three-dimensional imaging system, when mechanical scanning is used, it is inevitable to balance the scanning speed with the aperture no matter a coaxial optical path or a parallel axis optical path is adopted, since there is a difference in apertures of the emitting end and the receiving end. Moreover, when a micro-mirror of a Micro Electro Mechanical System (MEMS) is used for scanning, the aperture directly affects the scanning speed. Larger aperture will bring greater mechanical inertia and a lower scanning speed. In solid-state scanning methods, an optical phased array (OPA) is a common means, which performs processing by using a chip-based means, thus the cost is very sensitive to the chip area and the aperture is difficult to be very large. In order to save the cost, the system can be built up by using a way of wide-angle reception at the receiving end, but the wide-angle reception will introduce a lot of background noise, at the same time the device loss will be greatly increased, thereby the efficiency of the large-angle reception is very low. In addition, the three-dimensional imaging system based on planar array reception needs to develop a planar array reception chip. The period for designing and developing the planar array reception chip is very long, and the resolution is limited by the pixel size and the complexity of the signal processing circuit, therefore, it is difficult to implement high-resolution three-dimensional imaging, and there is also a problem of high cost. At the same time, since the emitting end adopts flood illumination, there is severe crosstalk among the signals received by various pixels, thus the stability is low.

In an embodiment, the problem of floodlight crosstalk can be solved by a combination of a scan-based emitting end and a planar array reception end. However, the resolution of the planar array reception chip is low, and a new uncertainty of the scan-based emitting end is introduced, which reduces the stability of the three-dimensional imaging system. Consequently, the technical contents of scan-based transmission and planar array reception have been constantly balanced and combined regarding the three-dimensional imaging systems, and at present, there is no technical means that is flexible enough and can be applied to various different three-dimensional imaging application scenarios.

In order to illustrate the technical solutions provided by the present application, detailed description will be made below in conjunction with the specific drawings and embodiments.

FIG. 1 is a passive nano-antenna array receiver provided by an embodiment of the present application, which includes a receiving lens 9, a passive nano-antenna array 10 at a receiving end, a focusing lens assembly 11, and an optical receiver 12. The receiving lens 9 is configured to receive incident light (for example, the light beam 6, light beam 7, and light beam 8 in FIG. 1), and focus the incident light to the passive nano-antenna array 10 at the receiving end; the passive nano-antenna array 10 at the receiving end is configured to deflect an angle of a light beam output by the receiving lens 9, and transmit outgoing light generated after the angle deflection to the focusing lens assembly 11, here, an optical axis of the outgoing light is perpendicular to the passive nano-antenna array 10 at the receiving end; the focusing lens assembly 11 is configured to focus outgoing light output by the passive nano-antenna array 10 at the receiving end to the optical receiver 12; and the optical receiver 12 is configured to convert a received optical signal into an electrical signal.

In this embodiment, the passive nano-antenna array receiver includes the receiving lens 9, the passive nano-antenna array 10 at the receiving end, the focusing lens assembly 11, and the optical receiver 12, thereby achieving an effect similar to a large-scale planar array receiver. Specifically, the receiving lens 9 focuses the incident light onto the passive nano-antenna array 10 at the receiving end, and the passive nano-antenna array 10 at the receiving end deflects the angle of the light beam output by the receiving lens 9 and transmits the outgoing light generated after the angle deflection to the focusing lens assembly 11, with the optical axis of the outgoing light being perpendicular to the passive nano-antenna array 10 at the receiving end, and then the focusing lens assembly 11 focuses the outgoing light to the light receiver 12. Compared with a conventional optical diffraction device, the light beam direction achieved by the passive nano-antenna array 10 at the receiving end has greater design flexibility, and at the same time can play a role of filtering for a specific wavelength.

Further, in combination with a scanning system at a emitting end, the three-dimensional imaging system based on the passive nano-antenna array receiver in this embodiment can simultaneously obtain a high signal-to-noise ratio (reception at a narrow viewing angle, emission at a narrow viewing angle) of the scanning system, and a large aperture and a capability of high-speed imaging of the planar array reception system.

In an embodiment, the passive nano-antenna array 10 at the receiving end includes a plurality of sub-antenna arrays, and the deflection directions of the plurality of sub-antenna arrays are different from each other.

Figure 2:
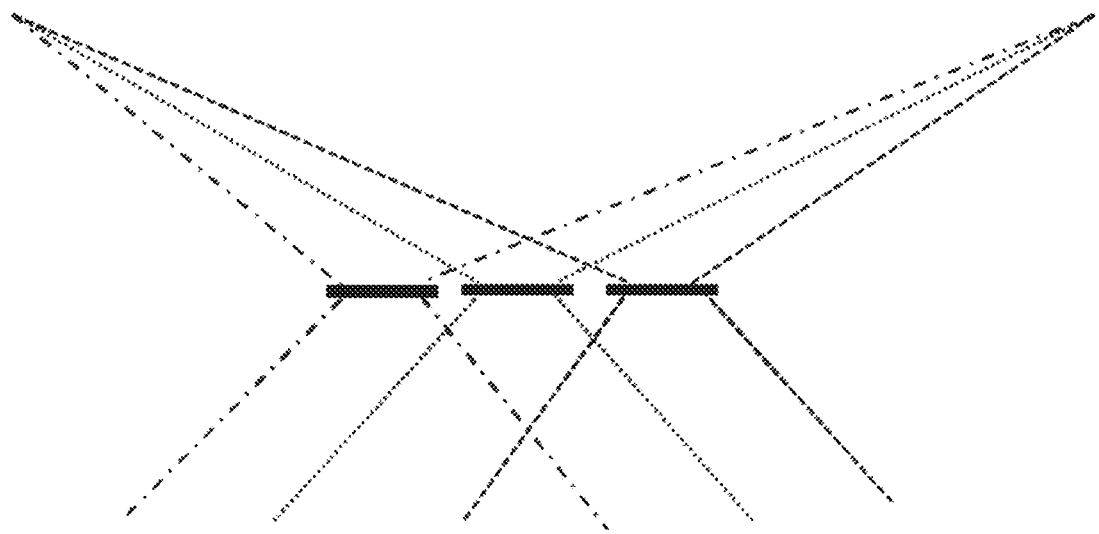
FIG. 2 is a schematic structural diagram of a passive nano-antenna array provided by an embodiment of the present application.

In the scan-based three-dimensional imaging system, the receiving end is a core problem to be solved. When the receiving end adopts the same scanning and receiving method, it is necessary to balance the aperture and the scanning speed, and the receiving end is very difficult to synchronize with the emitting end. The use of wide-angle reception at the receiving end will introduce a lot of background noise, resulting in a greatly shortened measurement distance. When the planar array receiver is used, each receiving pixel performs reception for a certain narrow field of view, which not only ensures the signal-to-noise ratio, but also achieves high-speed imaging, however, the development cost for the planar array receiver is expensive, and the area of the planar array receiver is greatly limited by the pixel size and the complexity of signal processing. In this embodiment, the passive nano-antenna array receiver is used as the planar array receiver, through taking advantage of great flexibility of the nano-antenna in light beam shaping and adopting the sub-antenna arrays as the pixel points, the photosensitive unit and the signal processing unit are changed from a large-scale array into a single point or a plurality of points. Specifically, as shown in FIG. 2, the incident light hits the sub-antenna arrays (as indicated by the black parts in FIG. 2). Similar to the planar array receiver, each sub-antenna array receives the incident light at a specific angle of view, and after the incident light passes through all the sub-antenna arrays, the optical axis of the outgoing light is changed into a direction perpendicular to the passive nano-antenna array 10 at the receiving end via refraction, and the refracted light field passes through the focusing lens assembly 11 and is refocused at the light receiver 12.

In an embodiment, the sub-antenna array includes a plurality of nano-antenna elements arranged in sequence, and the plurality of nano-antenna elements have a phase distribution with gradual gradients to achieve deflection control of the light beam.

In an embodiment, the plurality of nano-antenna elements are repeatedly arranged, and a spacing distance between adjacent nano-antenna elements is smaller than wavelength of the incident light. In a specific application, the wavelength range of the incident light beam needs to be determined in advance, so as to determine that the spacing of the nano-antenna elements in the passive nano-antenna array receiver is smaller than the wavelength of the incident light beam.

Further, the size of the nano-antenna element is smaller than twice the wavelength of incident light. In this embodiment, each sub-antenna array corresponds to a specific deflection angle, thereby deflecting the optical axis of the incident light focused thereon, for example, refracting the incident light focused thereon, so that the optical axis of the refracted outgoing light is perpendicular to the sub-antenna array, here the optical axis of the incident light is the centerline of the incident light beam, and the optical axis of the outgoing light is the centerline of the outgoing light beam.

Figure 3:
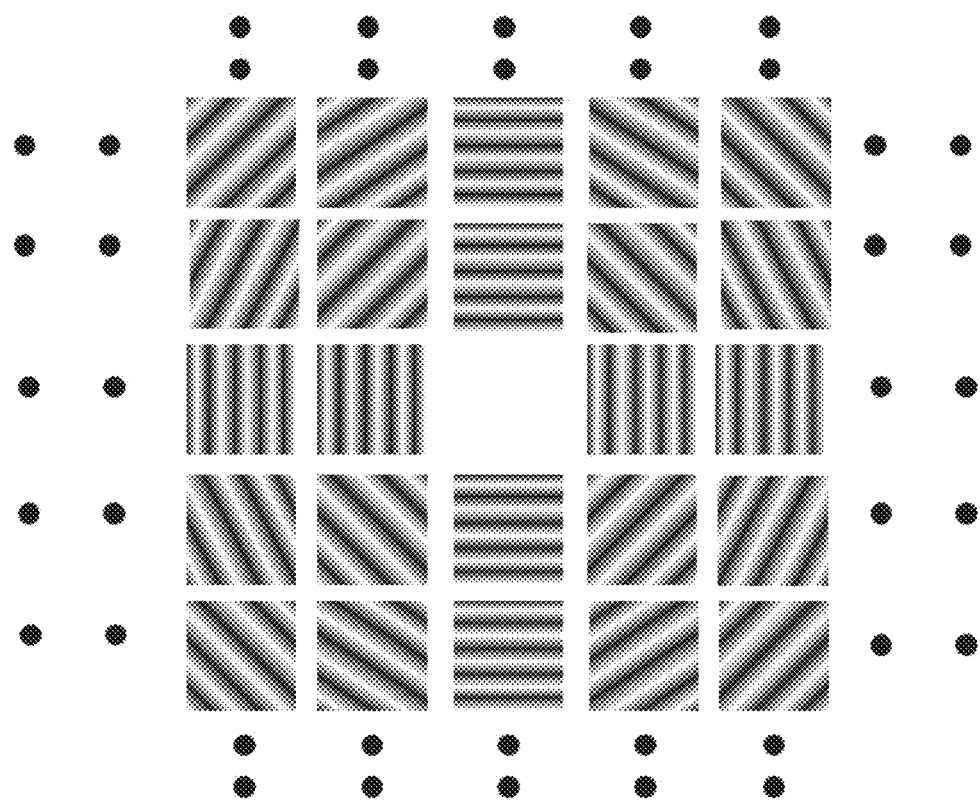
FIG. 3 is a schematic diagram of phase distribution of a passive nano-antenna array provided by an embodiment of the present application.
Figure 4:
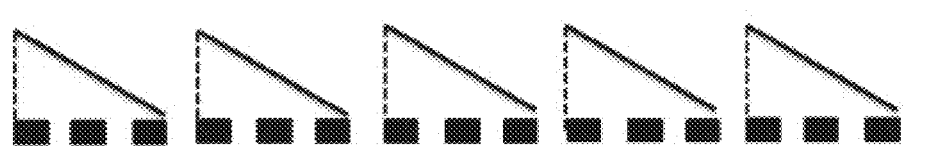
FIG. 4 is a schematic structural diagram of two sub-antenna arrays provided by an embodiment of the present application.
Figure 4:
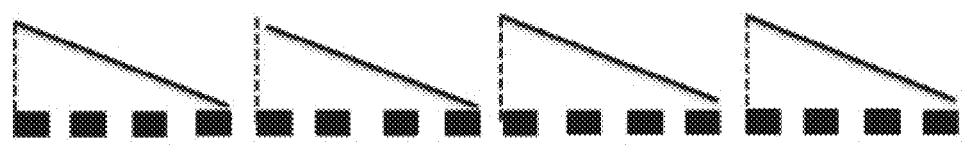
Figure 5:
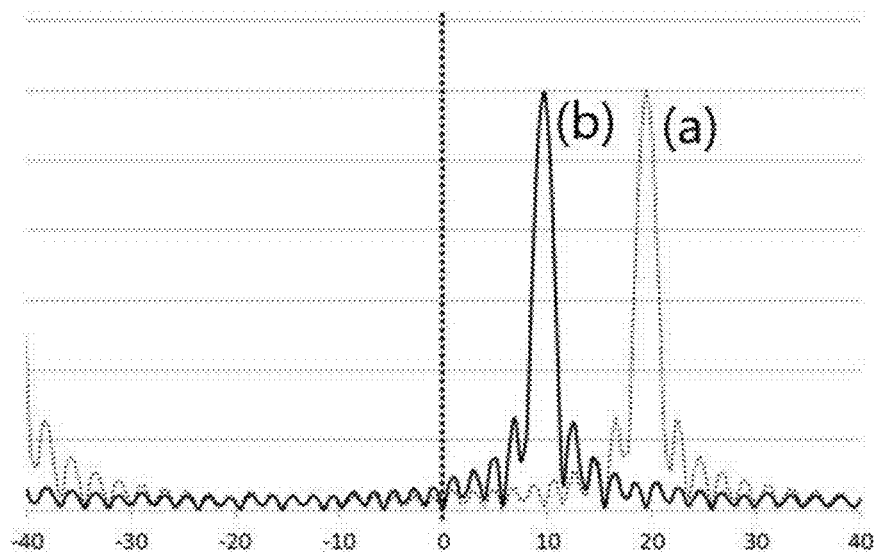
FIG. 5 is a schematic diagram of deflection angles of two sub-antenna arrays provided by an embodiment of this application.

In an embodiment, the overall phase distribution of the passive nano-antenna array 10 at the receiving end is as shown in FIG. 3, the deflection directions of the plurality of sub-antenna arrays are different from each other, and each sub-antenna array in the passive nano-antenna array 10 at the receiving end corresponds to one deflection angle. For example, as shown in FIG. 4, FIG. 4a adopts a 1550 nm antenna spacing, a phase difference of adjacent antennas is 120 degrees, and three antennas complete phase coverage of 360 degrees. The refraction direction of the light after transmitting through the antenna array is as shown in FIG. 5(a), an angle change of 19.4 degrees may be obtained at the wavelength of 1550 nm. FIG. 4b also adopts the 1550 nm antenna spacing, the phase difference between adjacent antennas is 90 degrees, and four antennas complete the phase coverage of 360 degrees. The refraction direction of the light after transmitting through the antenna is as shown in FIG. 5(b), and the angle change of 14.5 degrees may be obtained at the 1550 nm waveband, here the horizontal axis in FIG. 5 is the deflection angle. Therefore, the design of the optical nano-antenna provides great design flexibility, each pixel (i.e., sub-antenna array) may obtain one different deflection angle, and the entire array does not require external driving and is a passive device, which greatly simplifies the system design.

In an embodiment, a material of the nano-antenna element is at least one of a metal material, a semiconductor material and a media material.

In this embodiment, the metal material may be gold, silver, copper, aluminum, etc., the media material may be an optical media material, the semiconductor material or the media material may be titanium oxide (TiOx), silicon dioxide ($SiO_2$), silicon nitride (SiNx), gallium arsenide (GaAs) and aluminum gallium arsenide (AlGaAs).

In an embodiment, the material of the nano-antenna element is any one of silicon, gallium arsenide, aluminum gallium arsenide, silicon nitride, and indium phosphide.

In an embodiment, the center wavelength responded by the passive nano-antenna array receiver in this embodiment may be 1550 nm in the communication band, here the material of the nano-antenna element may include any one of single crystal silicon, polycrystalline silicon, or amorphous silicon.

In an embodiment, the shape of the nano-antenna element is at least one of a cylinder, a square, a cross, a circular hole, a square hole, a cross hole, a V-shape, an annular linear shape, and a curved shape.

In this embodiment, the antenna array layer is etched by using different masks to form the nano-antenna elements with different shapes. The shape of the nano-antenna element is not limited to a cylinder, a square, a cross, a circular hole, a square hole, a cross hole, a V-shape, an annular linear shape, and a curved shape, which may be set according to user needs.

In an embodiment, the relationship between the deflection angle of the sub-antenna array and the sub-antenna array is:

$$\theta = \arctan(D/f);$$

Where $\theta$ is the deflection angle, D is the distance between the sub-antenna array and the optical axis of the outgoing light, and f is the focal length of the receiving lens 9.

Figure 6:
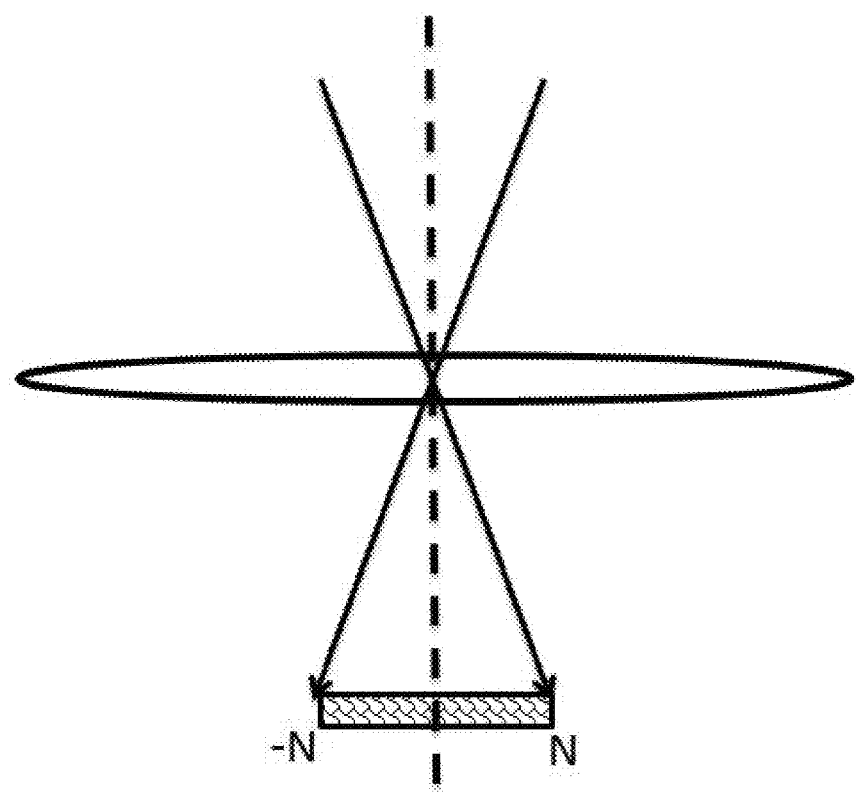
FIG. 6 is a schematic diagram of a deflection angle of a passive nano-antenna array provided by an embodiment of this application.

In this embodiment, each sub-antenna array in the passive nano-antenna array receiver serves as one pixel point, and the sub-antenna arrays are center-symmetrically distributed with the optical axis as the center. As shown in FIG. 6, assuming that the passive nano-antenna array receiver includes 2N (−N, N) sub-antenna arrays in total, then $\theta = \arctan(D/f)$, and $D = d*n$, where n is a serial number of the sub-antenna array, and d is the size of corresponding sub-array antenna. The optical axis of the incident light is deflected $\theta$ degrees by the passive nano-antenna array receiver, so that the optical axis of the outgoing light from the passive nano-antenna array receiver is perpendicular to the passive nano-antenna array receiver.

In an embodiment, the distance between the passive nano-antenna array receiver and the receiving lens 9 is equal to the focal length of the receiving lens 9.

In an embodiment, the optical receiver 12 is a single-point optical receiver or a multi-point optical receiver.

Figure 7:
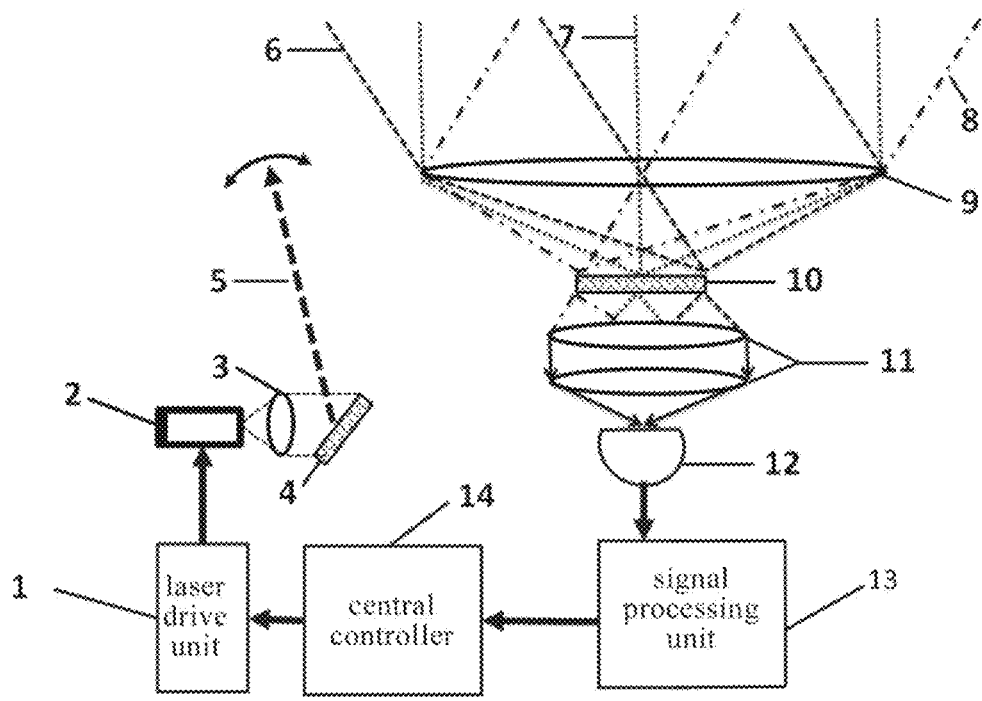
FIG. 7 is a schematic structural diagram of a three-dimensional imaging system provided by an embodiment of the present application.

An embodiment of the present application also provides a three-dimensional imaging system. Referring to FIG. 7, the three-dimensional imaging system includes:

a laser emitter unit configured to emit a laser signal, here the laser signal is reflected by a target object to generate a laser reflection signal;

a passive nano-antenna array receiver according to any one of the above embodiments, which is configured to receive the laser reflection signal and convert the laser reflection signal into a corresponding electrical signal;

a signal processing unit 13 configured to receive the electrical signal and generate target distance information based on the electrical signal;

a central controller 14 configured to transmit a scanning signal to the laser emitter unit to control an emission angle of the laser signal, and generate three-dimensional coordinates of the target object according to the scanning signal and the target distance information.

In this embodiment, the central controller controls the emission angle of the laser signal by transmitting the scanning signal to the laser emitter unit. The three-dimensional coordinates of the target object may be generated through combining the target distance signal generated by the signal processing unit, the emission angle of the laser signal, and the coordinate information of the three-dimensional imaging system.

Further, the laser emitter unit uses a scan-based mode to emit the laser signal. Through combining the scan-based emitting end with the passive nano-antenna array receiver provided in the above embodiments, not only the problem of flood crosstalk is solved, but also the high signal-to-noise ratio of the scanning system is obtained.

In an embodiment, referring to FIG. 7, the laser emitter unit includes:

a laser drive unit 1 configured to generate the laser drive signal;

a laser device 2 connected to the laser drive unit and configured to generate the laser signal according to the laser drive signal;

an emitting collimation lens 3 configured to collimate the laser signal;

a beam scanner 4 of the emitting end, which is connected to the central controller, configured to receive the scanning signal, and adjust the emission angle of the laser signal according to the scanning signal.

In an embodiment, the beam scanner 4 of the emitting end is any one of a mechanical scanner, a MEMS scanning mirror, a solid-state scanner with an optical phase array, and a spatial light modulator.

The three-dimensional imaging system based on the passive nano-antenna array receiver is as shown in FIG. 7. After the laser device 2 is modulated by the laser drive signal provided by the laser drive unit 1, the laser signal (for example, pulsed optical signal) is collimated by the emitting collimation lens 3, and then hits onto the beam scanner 4 of the emitting end to emit (such as the laser signal 5). The laser signal 5 hits onto the target object and is reflected. The reflected signal (for example, the incident light beam 6, the incident light beam 7, the incident light beam 8) passes through the receiving lens 9 with a large aperture and is focused on the passive nano-antenna array 10 at the receiving end. The passive nano-antenna array 10 at the receiving end includes sub-antenna arrays (pixel points), and each sub-antenna array corresponds to one deflection angle, so as to refract the incident light projecting on the pixel point into light parallel to the optical axis (i.e., the optical axis of the outgoing light is perpendicular to the passive nano-antenna array 10 at the receiving end). After passing through two lenses in the focusing lens assembly 11, the light with all incident angles is focused on a single receiver 12 or a plurality of light receivers 12, and then the signal processing unit 13 performs signal processing to recover the target distance information. The azimuth angle measurement of the whole three-dimensional imaging system is completed by the scan-based light spots, and the receiving end indifferently makes the light from all angles be received by one or several receivers to achieve an equivalent effect of wide-angle reception and planar array reception.

The above only describes optional embodiments of the present application, which are not intended to limit the present application. For those skilled in the art, the present application may have various modifications and variations. Any modification, equivalent replacement, improvement, etc. made within the spirit and principles of the present application shall be included in the scope of the claims of the present application.

What is claimed is:

1. A passive nano-antenna array receiver, comprising a receiving lens, a passive nano-antenna array at a receiving end, a focusing lens assembly, and an optical receiver; wherein
the receiving lens is configured to receive incident light and focus the incident light to the passive nano-antenna array at the receiving end;
the passive nano-antenna array is configured to deflect an angle of a light beam output by the receiving lens, and transmit outgoing light generated after an angle deflection to the focusing lens assembly, wherein an optical axis of the outgoing light is perpendicular to the passive nano-antenna array;
the focusing lens assembly is configured to focus an outgoing light output by the passive nano-antenna array to the optical receiver; and
the optical receiver is configured to convert a received optical signal into an electrical signal.

2. The passive nano-antenna array receiver of claim 1, wherein the passive nano-antenna array at the receiving end comprises a plurality of sub-antenna arrays, and deflection directions of the plurality of sub-antenna arrays are different from each other.

3. The passive nano-antenna array receiver of claim 2, wherein each sub-antenna array of the plurality of sub-antenna arrays comprises a plurality of nano-antenna elements sequentially arranged, and the plurality of nano-antenna elements have phase distribution with gradual gradients to achieve deflection control of a light beam.

4. The passive nano-antenna array receiver of claim 3, wherein a material of each of the plurality of nano-antenna elements is at least one of a metal material, a semiconductor material and a media material.

5. The passive nano-antenna array receiver of claim 3, wherein a shape of each of the plurality of nano-antenna elements is at least one of a cylinder, a square, a cross, a circular hole, a square hole, a cross hole, a V-shape, an annular linear shape, and a curved shape.

6. The passive nano-antenna array receiver of claim 1, wherein a relationship between a deflection angle of a sub-antenna array and a nano-antenna element is:

$$\theta=\arctan(D/f);$$

where $\theta$ is the deflection angle, D is a distance between the sub-antenna array and the optical axis of the outgoing light, and f is a focal length of the receiving lens.

7. The passive nano-antenna array receiver of claim 1, wherein the optical receiver is a single-point optical receiver or a multi-point optical receiver.

8. A three-dimensional imaging system, comprising:
a laser emitter unit, configured to emit a laser signal, wherein the laser signal is reflected by a target object to generate a laser reflection signal;
the passive nano-antenna array receiver of claim 1, configured to receive the laser reflection signal and convert the laser reflection signal into a corresponding electrical signal;
a signal processing unit, configured to receive the electrical signal and generate target distance information based on the electrical signal;
a central controller, configured to transmit a scanning signal to the laser emitter unit to control an emission angle of the laser signal, and configured to generate three-dimensional coordinates of the target object according to the scanning signal and the target distance information.

9. The three-dimensional imaging system of claim 8, wherein the laser emitter unit comprises:
a laser drive unit, configured to generate a laser drive signal;
a laser device, connected to the laser drive unit and configured to generate the laser signal according to the laser drive signal;
an emitting collimation lens, configured to collimate the laser signal;
a beam scanner of an emitting end, connected to the central controller and configured to receive the scanning signal and adjust the emission angle of the laser signal according to the scanning signal.

10. The three-dimensional imaging system of claim 9, wherein the beam scanner of the emitting end is any one of a mechanical scanner, a MEMS scanning mirror, a solid-state scanner with an optical phase array, and a spatial light modulator.

11. The three-dimensional imaging system of claim 8, wherein the passive nano-antenna array at the receiving end comprises a plurality of sub-antenna arrays, and deflection directions of the plurality of sub-antenna arrays are different from each other.

12. The three-dimensional imaging system of claim 11, wherein the sub-antenna array comprises a plurality of nano-antenna elements sequentially arranged, and the plurality of nano-antenna elements have phase distribution with gradual gradients to achieve deflection control of a light beam.

13. The three-dimensional imaging system of claim 12, wherein a material of the nano-antenna element is at least one of a metal material, a semiconductor material and a media material.

14. The three-dimensional imaging system of claim 12, wherein a shape of the nano-antenna element is at least one of a cylinder, a square, a cross, a circular hole, a square hole, a cross hole, a V-shape, an annular linear shape, and a curved shape.

15. The three-dimensional imaging system of claim 8, wherein a relationship between a deflection angle of a sub-antenna array and a nano-antenna element is:

$$\theta=\arctan(D/f);$$

where $\theta$ is the deflection angle, D is a distance between the sub-antenna array and the optical axis of the outgoing light, and f is a focal length of the receiving lens.

16. The three-dimensional imaging system of claim 8, wherein the optical receiver is a single-point optical receiver or a multi-point optical receiver.

* * * * *